(12) United States Patent
Lee et al.

(10) Patent No.: US 12,443,302 B2
(45) Date of Patent: Oct. 14, 2025

(54) TOUCH DISPLAY DEVICE

(71) Applicant: LG Display Co., Ltd., Seoul (KR)

(72) Inventors: JaeHo Lee, Paju-si (KR); Jisu Yoon, Paju-si (KR); Jiseok Yang, Paju-si (KR); Kyuhwan Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/781,600

(22) Filed: Jul. 23, 2024

(65) Prior Publication Data
US 2025/0044890 A1    Feb. 6, 2025

(51) Int. Cl.
*G06F 3/041* (2006.01)

(52) U.S. Cl.
CPC .................. *G06F 3/0412* (2013.01)

(58) Field of Classification Search
None
See application file for complete search history.

(56) References Cited

U.S. PATENT DOCUMENTS

2014/0267191 A1*  9/2014  Takahara ............ G06F 3/03545
                                                                345/179

\* cited by examiner

*Primary Examiner* — Brian M Butcher
(74) *Attorney, Agent, or Firm* — Seed Intellectual Property Law Group LLP

(57) ABSTRACT

A touch display device is disclosed. The touch display device includes a display panel. The display panel includes a light emitting element and a transistor made of a plurality of metal electrodes. The touch display device includes an infrared blocking film disposed on an emission surface of the display panel. The touch display device includes an infrared reflective pattern disposed on an inner or outer surface of the infrared blocking film.

15 Claims, 15 Drawing Sheets

TOUCH DISPLAY DEVICE

CROSS-REFERENCE TO RELATED APPLICATION

This application claims priority from Korean Patent Application No. 10-2023-0101170, filed on Aug. 2, 2023, which is hereby incorporated by reference for all purposes as if fully set forth herein.

BACKGROUND

Technical Field

Embodiments of the disclosure relate to a touch display device and, more specifically, to a touch display device that advances touch performance by improving dependence on the inclination angle of a stylus.

Description of Related Art

The growth of the intelligent society leads to increased demand for various types of display devices. Various display devices, such as liquid crystal displays, electroluminescent displays, or quantum dot light emitting displays, are being used.

The display device recognizes the user's finger touch or a pen touch on the display panel and performs input processing based on the recognized touch so as to provide more various functions.

As an example, a display device capable of touch recognition may include a plurality of touch electrodes arranged or embedded in a display panel and detect the presence of the user's touch on the display panel and coordinates of a touch by driving the touch electrodes.

Such touch display devices are in a trend of being adopted in more sectors, such as for large-scale touch display devices, such as vehicle displays and showcase displays, as well as mobile devices, such as smartphone or tablet PCs.

In this case, the touch function for the touch display device may use not only a passive stylus, such as a finger, but also an active stylus capable of transmitting and receiving signals to and from the display panel.

BRIEF SUMMARY

The inventors of the disclosure have provided various embodiments related to a touch display device that advances touch performance by improving dependence on the inclination angle of a stylus.

Embodiments of the disclosure may provide a touch display device capable of process optimization through a stacked structure of an infrared reflective pattern and an infrared blocking film.

Embodiments of the disclosure may provide a touch display device capable of effectively detecting reflected infrared lights by using an infrared blocking film that effectively reduces infrared light reflected in the touch display device.

Embodiments of the disclosure may provide a touch display device comprising a display panel including a light emitting element and a transistor made of a plurality of metal electrodes, an infrared blocking film disposed on an emission surface of the display panel, and an infrared reflective pattern disposed on an inner or outer surface of the infrared blocking film.

According to embodiments of the disclosure, it is possible to advance touch performance by improving dependence on the inclination angle of a stylus.

According to embodiments of the disclosure, it is also possible to optimize processes through a stacked structure of an infrared reflective pattern and an infrared blocking film.

According to embodiments of the disclosure, it is also possible to effectively destruct detect infrared lights by using an infrared blocking film that effectively destructs infrared light reflected in the touch display device.

BRIEF DESCRIPTION OF THE SEVERAL VIEWS OF THE DRAWINGS

The above and other objects, features, and advantages of the disclosure will be more clearly understood from the following detailed description, taken in conjunction with the accompanying drawings, in which.

DETAILED DESCRIPTION

Figure 1:
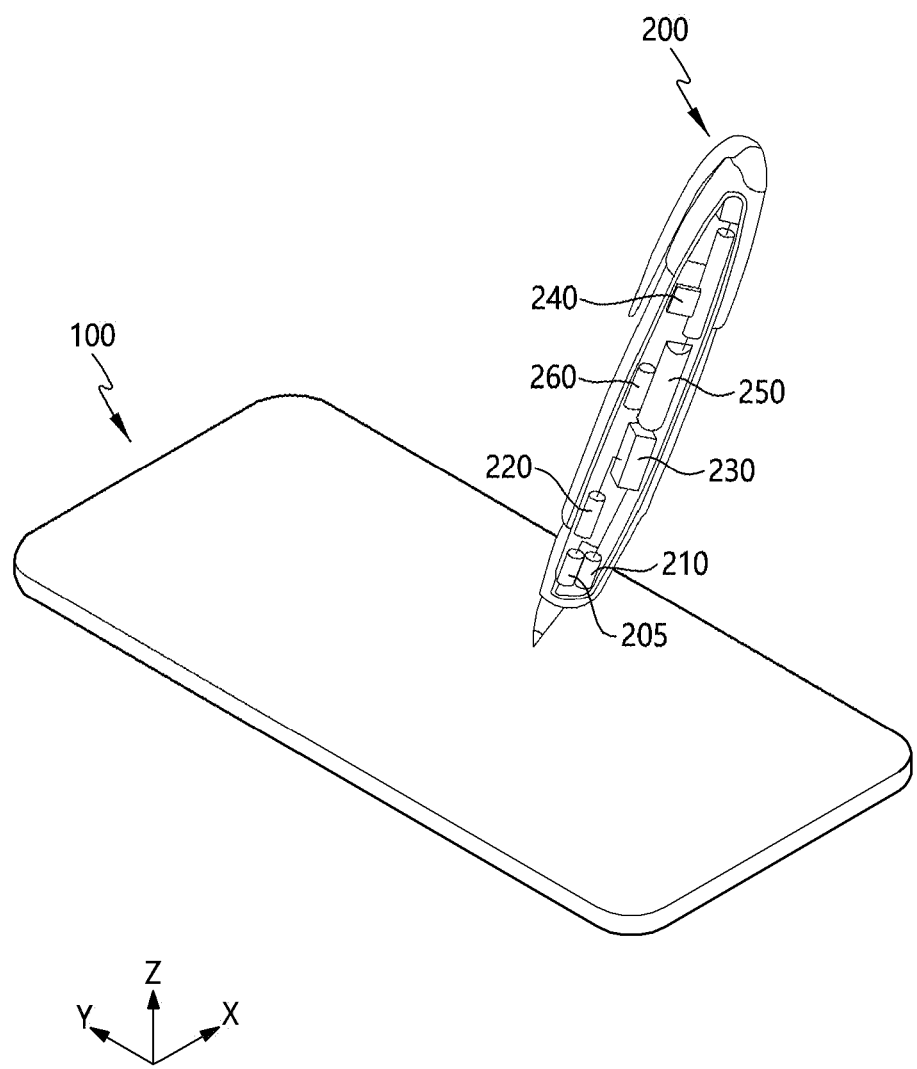
FIG. 1 is a perspective view illustrating a touch sensing system according to embodiments of the disclosure.

Hereinafter, some embodiments of the disclosure will be described in detail with reference to exemplary drawings. In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements, etc., but is used merely to distinguish the corresponding element from other elements.

When it is mentioned that a first element "is connected or coupled to", "contacts or overlaps", etc., a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc., each other via a fourth element. Here, the second element may be included in at least one of two or more elements that "are connected or coupled to", "contact or overlap", etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the disclosure will be described in detail with reference to the accompanying drawings.

Figure 2:
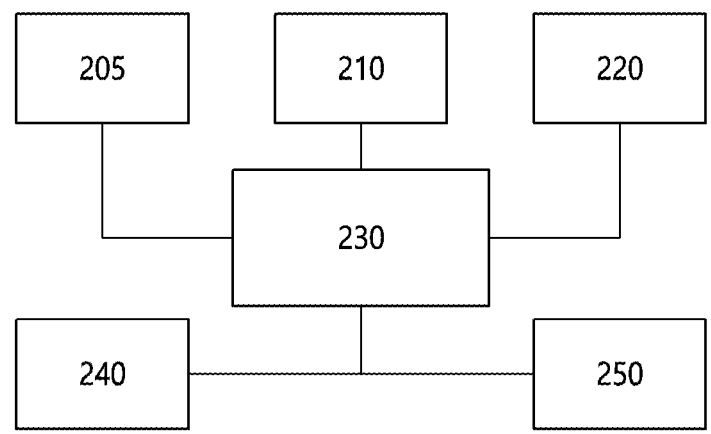
FIG. 2 is a block diagram conceptually illustrating an infrared stylus in a touch sensing system according to embodiments of the disclosure.
Figure 3:
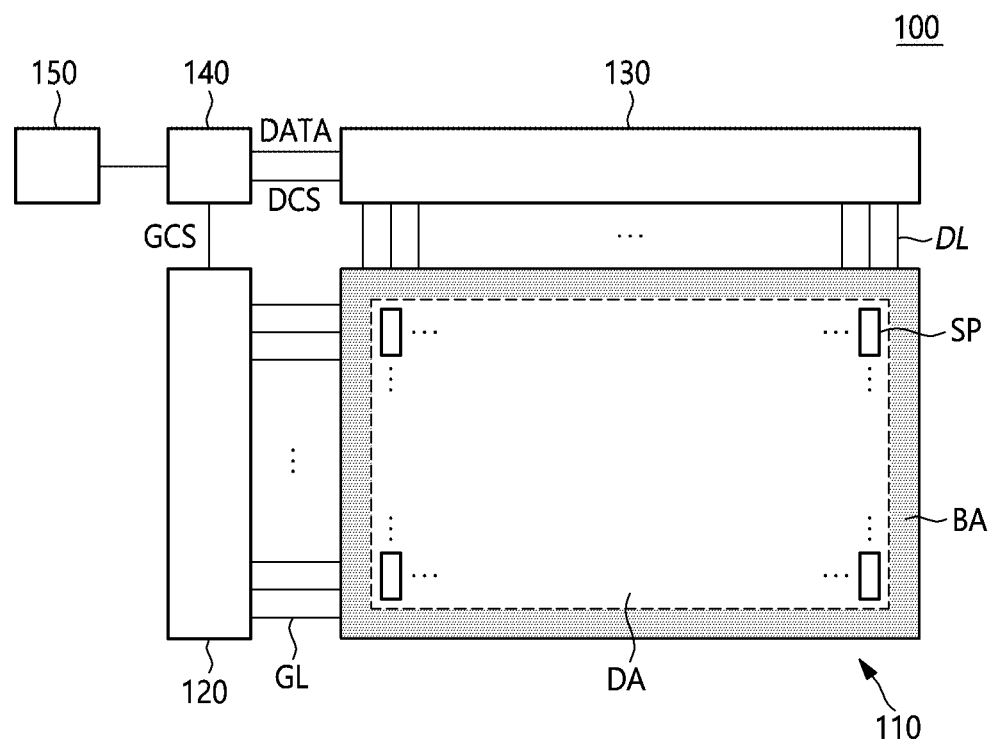
FIG. 3 is a block diagram schematically illustrating a touch display device in a touch sensing system according to embodiments of the disclosure.

FIG. 1 is a perspective view illustrating a touch sensing system according to embodiments of the disclosure. FIG. 2 is a block diagram conceptually illustrating an infrared stylus in a touch sensing system according to embodiments of the disclosure. FIG. 3 is a block diagram schematically illustrating a touch display device in a touch sensing system according to embodiments of the disclosure.

Referring to FIGS. 1 to 3, a touch sensing system according to embodiments of the disclosure may include a touch display device 100 and an infrared stylus 200.

The infrared stylus 200 may include an infrared light emitting element 205, an infrared sensor 210, a piezoelectric sensor 220, a processor 230, a communication module 240, a memory 250, and a battery 260.

The infrared stylus 200 may be a smart pen or active pen capable of generating coordinate data using an optical method.

The infrared light emitting element 205 is disposed in front of the infrared stylus 200 and may emit infrared light in the direction of the touch display device 100. The infrared light emitting element 205 may be formed of an infrared light emitting diode.

The infrared sensor 210 may be disposed in front of the infrared stylus 200. The infrared sensor 210 may detect reflected infrared light transferred from the touch display device 100 through an infrared absorption pattern and an infrared reflective structure formed in the touch display device 100.

The infrared sensor 210 may continuously photograph reflected infrared light at a corresponding position according to the movement of the infrared stylus 200, and provide infrared pattern information detected through the reflected infrared light to the processor 230.

The piezoelectric sensor 220 may sense the pressure applied by the infrared stylus 200 to the touch display device 100. The piezoelectric sensor 220 may provide pressure information about the infrared stylus 200 to the processor 230.

The processor 230 may receive at least one piece of infrared pattern information from the infrared sensor 210. The processor 230 may convert the infrared pattern information into a data code and generate coordinate data using the data code.

In this case, the processor 230 may quickly generate coordinate data without complex computations or corrections by converting the infrared pattern information into a one-to-one corresponding data code. Therefore, the touch sensing system of the disclosure may reduce power consumption and simplify driving operations.

The processor 230 may transmit the generated coordinate data to the touch display device 100 through the communication module 240.

The communication module 240 may perform wired or wireless communication with an external device. For example, the communication module 240 may transmit and receive wired or wireless signals with the communication circuit of the touch display device 100.

The memory 250 may store data necessary for the driving operation of the infrared stylus 200. Since the infrared stylus 200 may convert the infrared pattern information into corresponding data code and may directly provide the coordinate data generated therefrom to the touch display device 100, the infrared stylus 200 may include a memory 250 having a capacity corresponding to one piece of infrared pattern information.

The touch display device 100 according to embodiments of the disclosure may include a display panel 110 and a driving circuit for driving the display panel 110.

The display panel 110 may include a display area DA in which images are displayed and a bezel area BA in which no image is displayed. The bezel area BA may also be referred to as a non-display area.

The display panel 110 may include a plurality of subpixels SP for displaying images. For example, a plurality of subpixels SP may be disposed in the display area DA. In some cases, at least one subpixel SP may be disposed in the bezel area BA. At least one subpixel SP disposed in the bezel area BA is also referred to as a dummy subpixel.

The display panel 110 may include a plurality of signal lines for driving a plurality of subpixels SP. For example, the plurality of signal lines may include a plurality of data lines DL and a plurality of gate lines GL. The signal lines may further include other signal lines than the plurality of data lines DL and the plurality of gate lines GL according to the structure of the subpixel SP. For example, the other signal lines may include driving voltage lines and reference voltage lines.

The plurality of data lines DL and the plurality of gate lines GL may cross each other. Each of the plurality of data lines DL may be disposed while extending in a first direction. Each of the plurality of gate lines GL may be disposed while extending in a second direction. Here, the first direction may be a column direction and the second direction may be a row direction. In the disclosure, the column direction and the row direction are relative. For example, the column direction may be a vertical direction and the row direction may be a horizontal direction. As another example, the column direction may be a horizontal direction and the row direction may be a vertical direction.

The driving circuit may include a data driving circuit 130 for driving a plurality of data lines DL and a gate driving circuit 120 for driving a plurality of gate lines GL. The driving circuit may further include a timing controller 140 for controlling the data driving circuit 130 and the gate driving circuit 120.

The data driving circuit 130 is a circuit for driving the plurality of data lines DL, and may output data signals (also referred to as data voltages) corresponding to image signals to the plurality of data lines DL. The gate driving circuit 120 is a circuit for driving the plurality of gate lines GL and may generate gate signals, and output the gate signals to the plurality of gate lines GL. The gate signal may include one or more scan signals and emission signals.

The timing controller 140 may start a scan according to the timing implemented in each frame and may control data driving at an appropriate time according to the scan. The timing controller 140 may convert input image data input from the outside to suit the data signal format used by the data driving circuit 130 and supply the converted image data DATA to the data driving circuit 130.

The timing controller 140 may receive display driving control signals, along with input image data, from an external host system. For example, the display driving control signals may include a vertical synchronizing signal, a horizontal synchronizing signal, an input data enable signal, and a clock signal.

The timing controller 140 may generate the data driving control signal DCS and the gate driving control signal GCS based on display driving control signals input from the host system. The timing controller 140 may control the driving operation and driving timing of the data driving circuit 130 by supplying the data driving control signal DCS to the data driving circuit 130. The timing controller 140 may control the driving operation and driving timing of the gate driving circuit 120 by supplying the gate driving control signal GCS to the gate driving circuit 120.

The data driving circuit 130 may include one or more source driving integrated circuits SDIC. Each source driving integrated circuit may include a shift register, a latch circuit, a digital to analog converter (DAC), an output buffer, and the like. In some cases, each source driving integrated circuit may further include an analog to digital converter (ADC).

For example, each source driving integrated circuit may be connected with the display panel 110 by a tape automated bonding (TAB) method or connected to a bonding pad of the display panel 110 by a chip on glass (COG) or chip on panel (COP) method or may be implemented by a chip on film (COF) method and connected with the display panel 110.

The gate driving circuit 120 may output a gate signal of a turn-on level voltage or a gate signal of a turn-off level voltage according to the control of the timing controller 140. The gate driving circuit 120 may sequentially drive the plurality of gate lines GL by sequentially supplying gate signals of the turn-on level voltage to the plurality of gate lines GL.

The gate driving circuit 120 may include one or more gate driving integrated circuits GDIC.

The gate driving circuit 120 may be connected with the display panel 110 by TAB method or connected to a bonding pad of the display panel 110 by a COG or COP method or may be connected with the display panel 110 according to a COF method. Alternatively, the gate driving circuit 120 may be formed, in a gate in panel (GIP) type, in the bezel area BA of the display panel 110. The gate driving circuit 120 may be disposed on the substrate or may be connected to the substrate. In other words, the gate driving circuit 120 that is of a GIP type may be disposed in the bezel area BA of the substrate. The gate driving circuit 120 that is of a chip-on-glass (COG) type or chip-on-film (COF) type may be connected to the substrate.

Meanwhile, at least one of the data driving circuit 130 and the gate driving circuit 120 may be disposed in the display area DA. For example, at least one of the data driving circuit 130 and the gate driving circuit 120 may be disposed not to overlap the subpixels SP or to overlap all or some of the subpixels SP.

The data driving circuit 130 may be connected to one side (e.g., an upper or lower side) of the display panel 110. Depending on the driving scheme or the panel design scheme, the data driving circuit 130 may be connected with both sides (e.g., upper and lower sides) of the self-emission display panel 110, or two or more of the four sides of the self-emission display panel 110.

The gate driving circuit 120 may be connected with one side (e.g., a left or right side) of the display panel 110. Depending on the driving scheme or the panel design scheme, the gate driving circuit 120 may be connected with both sides (e.g., left and right sides) of the display panel 110, or two or more of the four sides of the display panel 110.

The timing controller 140 may be implemented as a separate component from the data driving circuit 130, or the timing controller 140 and the data driving circuit 130 may be integrated into an integrated circuit (IC). The timing controller 140 may be a controller used in typical display technology or a control device that may perform other control functions as well as the functions of the timing controller, or a circuit in the control device. The timing controller 140 may be implemented as various circuits or electronic components, such as an integrated circuit (IC), a field programmable gate array (FPGA), an application specific integrated circuit (ASIC), or a processor.

The timing controller 140 may be mounted on a printed circuit board or a flexible printed circuit and may be electrically connected with the data driving circuit 130 and the gate driving circuit 120 through the printed circuit board or the flexible printed circuit. The timing controller 140 may transmit/receive signals to/from the data driving circuit 130 according to one or more predetermined interfaces. The interface may include, e.g., a low voltage differential signaling (LVDS) interface, an EPI interface, and a serial peripheral interface (SP).

The touch display device 100 according to embodiments of the disclosure may be a self-emissive display device in which the display panel 110 emits light by itself. When the touch display device 100 according to the embodiments of the disclosure is a self-emissive display device, each of the plurality of subpixels SP may include a light emitting element. For example, the touch display device 100 according to embodiments of the disclosure may be an organic light emitting diode display in which the light emitting element is implemented as an organic light emitting diode (OLED). As another example, the touch display device 100 according to embodiments of the disclosure may be an inorganic light emitting display device in which the light emitting element is implemented as an inorganic material-based light emitting diode. As another example, the touch display device 100 according to embodiments of the disclosure may be a quantum dot display device in which the light emitting element is implemented as a quantum dot which is self-emission semiconductor crystal.

The timing controller 140 may perform wired/wireless communication with an infrared stylus through the communication circuit 150.

The communication circuit 150 may receive coordinate data from the infrared stylus 200 and provide the coordinate data to the timing controller 140.

The timing controller 140 may generate image data DATA by combining input image data supplied from the host system and the coordinate data supplied from the infrared stylus 200.

The data driving circuit 130 may display the image data DATA including the coordinate data of the infrared stylus 200 through the display panel 110.

Figure 4:
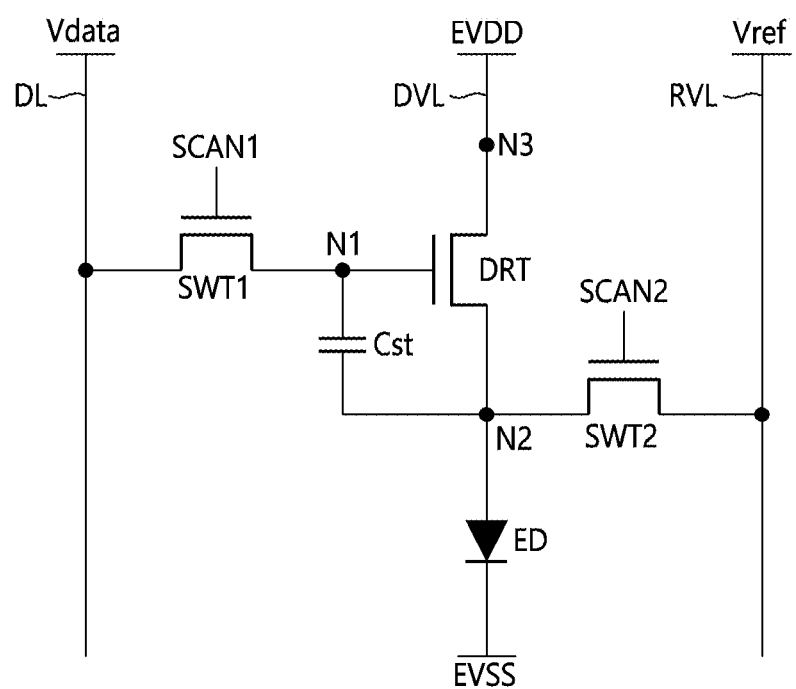
FIG. 4 is a view illustrating an example of a circuit constituting a subpixel in a touch display device according to embodiments of the disclosure.

FIG. 4 is a view illustrating an example of a circuit constituting a subpixel in a touch display device according to embodiments of the disclosure.

Referring to FIG. 4, in the touch display device 100 according to embodiments of the disclosure, the subpixel SP may include one or more transistors and a capacitor and may have a light emitting element disposed therein.

For example, the subpixel SP may include a driving transistor DRT, a first switching transistor SWT1, a second switching transistor SWT2, a storage capacitor Cst, and a light emitting diode ED.

The driving transistor DRT includes the first node N1, second node N2, and third node N3. The first node N1 of the driving transistor DRT may be a gate node to which the data voltage Vdata is applied from the data driving circuit 130 through the data line DL when the first switching transistor SWT1 is turned on.

The second node N2 of the driving transistor DRT may be electrically connected with the anode electrode of the light emitting diode ED and may be the source node or drain node.

The third node N3 of the driving transistor DRT may be electrically connected with the driving voltage line DVL to which the subpixel driving voltage EVDD is applied and may be the drain node or the source node.

In this case, during a display driving period, a subpixel driving voltage EVDD necessary for displaying an image may be supplied to the driving voltage line DVL. For example, the subpixel driving voltage EVDD necessary for displaying an image may be 27V.

The first switching transistor SWT1 is electrically connected between the first node N1 of the driving transistor DRT and the data line DL, and the gate line GL is connected to the gate node. Thus, the switching transistor SWT is operated according to the first scan signal SCAN1 supplied through the gate line GL. When turned on, the first switching transistor SWT1 transfers the data voltage Vdata supplied through the data line DL to the gate node of the driving transistor DRT, thereby controlling the operation of the driving transistor DRT.

The second switching transistor SWT2 is electrically connected between the second node N2 of the driving transistor DRT and the reference voltage line RVL, and the gate line GL is connected to the gate node and is operated according to the second scan signal SCAN2 supplied through the gate line GL. When the second switching transistor SWT2 is turned on, a reference voltage Vref supplied through the reference voltage line RVL is transferred to the second node N2 of the driving transistor DRT.

In other words, as the first switching transistor SWT1 and the second switching transistor SWT2 are controlled, the voltage of the first node N1 and the voltage of the second node N2 of the driving transistor DRT are controlled, so that the current for driving the light emitting diode ED may be supplied.

The gate nodes of the first switching transistor SWT1 and the second switching transistor SWT2 may be commonly connected to one gate line GL or may be connected to different gate lines GL. An example is shown in which the first switching transistor SWT1 and the second switching transistor SWT2 are connected to different gate lines GL in which case the first switching transistor SWT1 and the second switching transistor SWT2 may be independently controlled by the first scan signal SCAN1 and the second scan signal SCAN2 transferred through different gate lines GL.

In contrast, if the first switching transistor SWT1 and the second switching transistor SWT2 are connected to one gate line GL, the first switching transistor SWT1 and the second switching transistor SWT2 may be simultaneously controlled by the first scan signal SCAN1 or second scan signal SCAN2 transferred through one gate line GL, and the aperture ratio of the subpixel SP may be increased.

The transistor disposed in the subpixel SP may be an n-type transistor or a p-type transistor and, in the shown example, the transistor is an n-type transistor.

The storage capacitor Cst is electrically connected between the first node N1 and second node N2 of the driving transistor DRT and maintains the data voltage Vdata during one frame.

The storage capacitor Cst may also be connected between the first node N1 and third node N3 of the driving transistor DRT depending on the type of the driving transistor DRT. The anode electrode of the light emitting diode ED may be electrically connected with the second node N2 of the driving transistor DRT, and a base voltage EVSS may be applied to the cathode electrode of the light emitting diode ED.

The base voltage EVSS may be a ground voltage or a voltage higher or lower than the ground voltage. The base voltage EVSS may be varied depending on the driving state. For example, the base voltage EVSS at the time of display driving and the base voltage EVSS at the time of sensing driving may be set to differ from each other.

The first switching transistor SWT1 and the second switching transistor SWT2 may be referred to as scan transistors controlled through scan signals SCAN1 and SCAN2.

The structure of the subpixel SP may further include one or more transistors or, in some cases, further include one or more capacitors.

The touch display device 100 of the disclosure may effectively detect reflected infrared light by using an infrared reflective pattern capable of scattering infrared lights and an infrared blocking film capable of reducing infrared lights reflected in the display panel 110.

Figure 5:
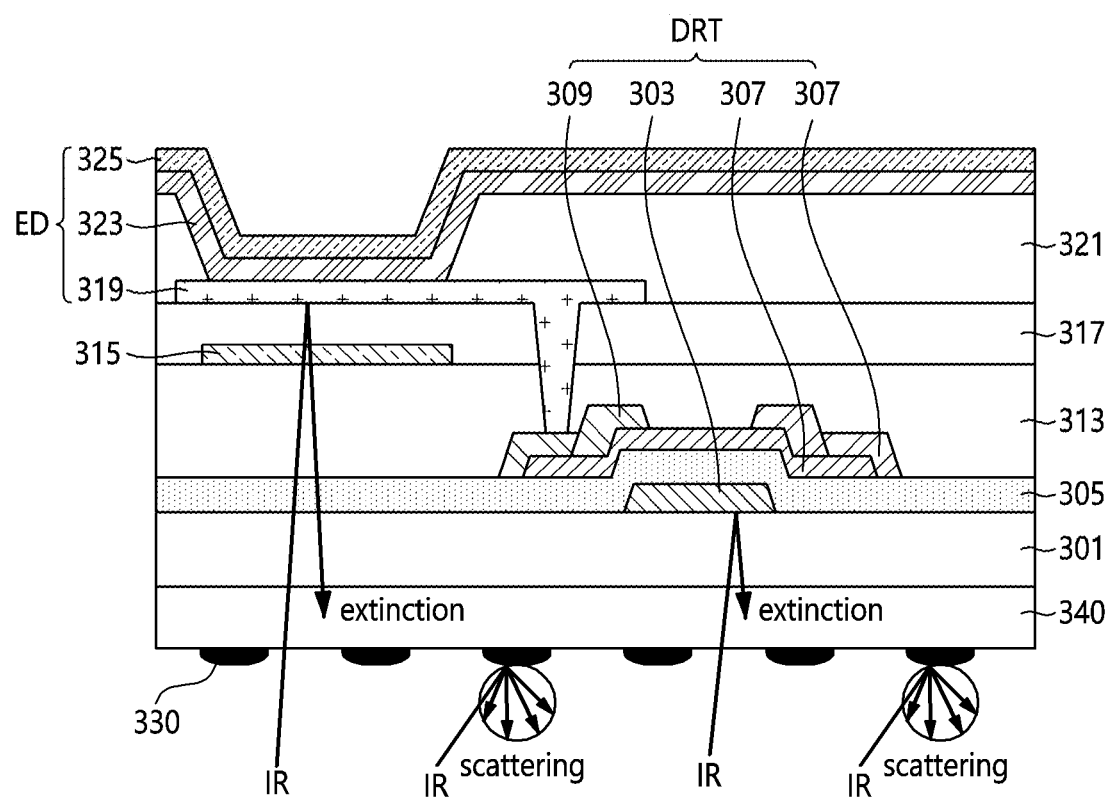
FIG. 5 is a cross-sectional view schematically illustrating a touch display device according to embodiments of the disclosure.

FIG. 5 is a cross-sectional view schematically illustrating a touch display device according to embodiments of the disclosure.

Referring to FIG. 5, a touch display device 100 according to embodiments of the disclosure may include a substrate 301, a driving transistor DRT, a color filter 315, a light emitting element ED, an infrared reflective pattern 330, and an infrared blocking film 340.

Here, the driving transistor DRT is illustrated as an example, but the switching transistors SWT1 and SWT2 may have a structure similar to that of the driving transistor DRT depending on the position.

The substrate 301 may have a flexible characteristic. Here, the flexible characteristic may be interpreted as the same meaning as a bendable, unbreakable, rollable, foldable characteristic, or the like.

The substrate 301 may be formed of a transparent glass material or plastic.

When the substrate 301 is formed of plastic, it may be referred to as a plastic film or a plastic substrate. For example, the substrate 301 may include one selected from the group consisting of a polyester-based polymer, a silicon-based polymer, an acrylic polymer, a polyolefin-based polymer, and a copolymer thereof. Specifically, the substrate 301 may be formed of polyimide (PI). Polyimide (PI) is widely used for a plastic substrate because it may be applied to a high-temperature process and may be coated.

When the substrate 301 is formed of polyimide (PI), a manufacturing process of the touch display device 100 may be performed in a situation in which a supporting substrate formed of glass is disposed under the substrate 301, and the supporting substrate may be removed after the manufacturing process of the touch display device 100 is completed. Further, after the supporting substrate is removed, a back plate for supporting the substrate 301 may be disposed under the substrate 301.

The driving transistor DRT includes a gate electrode 303, an active layer 307, a drain electrode 309, and a source electrode 311, and is a transistor for driving the light emitting element ED. The driving transistor DRT may be a bottom gate structure in which the gate electrode 303, the gate insulation layer 305, the active layer 307, the drain electrode 309, and the source electrode 311 are sequentially stacked.

The gate electrode 303 may be formed of a metallic material, e.g., any one of molybdenum (Mo), aluminum (Al), chromium (Cr), gold (Au), titanium (Ti), nickel (Ni), neodymium (Nd), and copper (Cu), or an alloy thereof, but is not limited thereto. Further, the gate electrode 303 may have a single layer or multiple layers.

The gate insulation layer 305 may be disposed on the substrate 301 to cover the gate electrode 303. The gate insulation layer 305 insulates the gate electrode 303 and the active layer 307 from each other. The gate insulation layer 305 may be formed of an insulative inorganic material such as silicon oxide (SiOx) or silicon nitride (SiNx), or may be formed of an insulative organic material.

The active layer 307 may be disposed on the gate insulation layer 305. The active layer 307 may be formed of polycrystalline silicon, and in this case, a partial area may be doped with impurities. Further, the active layer 307 may be formed of amorphous silicon, an organic semiconductor material, or oxide.

The source electrode 311 and the drain electrode 309 may be disposed on the gate insulation layer 305 and the active layer 307. The source electrode 311 and the drain electrode 309 may be formed of a metallic material, and may be formed of, e.g., any one of molybdenum (Mo), aluminum (Al), chromium (Cr), gold (Au), titanium (Ti), nickel (Ni), neodymium (Nd), and copper (Cu), or an alloy thereof, but are not limited thereto. Further, the source electrode 311 and the drain electrode 309 may have a single layer or multiple layers.

A planarization layer 313 is disposed on the driving transistor DRT. The planarization layer 313 is an insulation layer for protecting the driving transistor DRT and planarizing an upper portion of the driving transistor DRT. The planarization layer 313 may include a contact hole for electrically connecting the driving transistor DRT and the anode electrode 319 of the light emitting element ED.

Specifically, the planarization layer 313 includes a contact hole exposing any one of the source electrode 311 or the drain electrode 309 of the driving transistor DRT. The planarization layer 313 may be formed of an organic insulating material. The planarization layer 313 may be variously deformed, such as being formed as a single layer or may be composed of double or multiple layers.

A plurality of color filters 315 may be disposed on the planarization layer 313 at a position corresponding to the emission area. The color filter 315 may be formed to emit red, green, blue, and white colors. The color filters 315 of each color may be sequentially arranged in a horizontal direction or a vertical direction, or may be alternately arranged.

An overcoat layer 317 may be positioned on the planarization layer 313 to cover the color filter 315.

The light emitting element ED is disposed on the overcoat layer 317. The light emitting element ED is driven by the driving transistor DRT and includes an anode electrode 319 and a cathode electrode 325 facing each other, and an emission layer 323 interposed between them. The emission area of the light emitting element ED may be defined by a bank 321.

The anode electrode 319 is electrically connected to the driving transistor DRT. Specifically, the anode electrode 319 may be connected to any one of the source electrode 309 or the drain electrode 311 of the driving transistor DRT through a contact hole formed in the overcoat layer 317 and the planarization layer 313. Here, the anode electrode 319 is electrically connected to the drain electrode 311 of the driving transistor DRT. In this case, an image signal for displaying an image signal is applied to the anode electrode 319 through the drain electrode 311.

Since the anode electrode 319 must supply holes to the emission layer 323, the anode electrode 319 is formed of a conductive material having a high work function. For example, the anode electrode 319 may be formed of a transparent conductive oxide (TCO) such as indium tin oxide (ITO). When the touch display device 100 is a bottom emission type organic light emitting display device, a transparent conductive layer including a reflective layer with high reflectance may be disposed over the anode electrode 319.

The anode electrodes 319 are disposed on the overcoat layer 317 to be spaced apart from each other for each subpixel.

The emission layer 323 is disposed on the anode electrode 319. The emission layer 323 may be formed of a phosphorescent or fluorescent material, and may further include a hole injecting layer, a hole transporting layer, an electron transporting layer, an electron injecting layer, or the like, if necessary. The emission layer 323 may include a material capable of emitting light of a specific color. For example, the emission layer 323 may include a light emitting material capable of emitting any one of red, green, and blue light. However, the disclosure is not limited thereto, and the emission layer 323 may include a light emitting material capable of emitting light of a different color.

The cathode electrode 325 is disposed to face the anode electrode 319 with the emission layer 323 interposed between them. The cathode electrode 325 supplies electrons to the emission layer 323. For example, the cathode electrode 325 may be formed of a metallic material having a low work function, such as a metal alloy such as MgAg, a metal alloy including ytterbium (Yb), or the like.

The bank 321 is disposed on the overcoat layer 317 for the remaining area except for the emission area. In other words, the bank 321 may be disposed to cover only a portion of the anode electrode 319 to expose a portion of the anode electrode 319, and an area corresponding to a portion of the anode electrode 319 exposed by the bank 321 may be defined as a emission area. The bank 321 may be formed of an inorganic insulating material such as silicon oxide or silicon nitride, or an organic insulating material such as an acrylic resin or an imide resin.

An encapsulation layer (not shown) may be disposed on the cathode electrode 325 of the light emitting element ED. The encapsulation layer is a component for protecting the light emitting element ED vulnerable to moisture from being exposed to moisture. For example, the encapsulation layer may be formed of a structure in which an inorganic layer and an organic layer are alternately stacked, or a structure in which an inorganic layer/organic layer/inorganic layer are stacked, but is not limited thereto.

Meanwhile, when the touch display device 100 is a bottom emission structure, an infrared blocking film 340 and an infrared reflective pattern 330 made of encrypted patterns may be disposed under the substrate 301 corresponding to the emission surface.

The infrared reflective pattern 330 may include a pattern area and an opening area. A dot pattern capable of reflecting infrared lights IR may be disposed as an encrypted form in the pattern area, and infrared lights coming from the outside may be transmitted through the opening area. The dot pattern forming the pattern area may have an oval or circular protruding structure to make a scattered reflection of infrared lights.

The infrared reflective pattern 330 may be formed of a protruding structure in which an oxide such as silicon oxide (SiO2) or titanium oxide (TiO2) is deposited as a multilayer thin film. Additionally, the infrared reflective pattern 330 may be formed to have characteristics of a specific reflectance (e.g., 80%) or more for infrared lights.

Meanwhile, the infrared light transmitted through the opening area and then reflected in the display panel 110 may be extinguished by the infrared blocking film 340 and not transmitted to the outside.

The infrared reflective pattern 330 may be formed through a photo process using a photo resist or a printing process using an ink material. At this time, when the infrared reflective pattern 330 is printed on the surface of the infrared blocking film 340 through the printing process, process optimization may be achieved by increase of production efficiency and reduction of process costs since the work process may be simplified.

Infrared light incident on the opening area of the infrared reflective pattern 330 may be reflected at the anode electrode 319 located in the display panel 110 or a metal electrode including a reflective layer such as the gate electrode 303 of the driving transistor DRT and transmitted back to the outside of the display panel 110.

However, the infrared light reflected in the display panel 110 may be cancelled out by the infrared blocking film 340 and thereby may be destructed or reduced.

As a result, the touch display device 100 of the disclosure may effectively detect touch coordinates of the infrared stylus 200 through a stacked structure of the infrared reflective pattern 330 and the infrared blocking film 340 formed on one side of the display panel 110.

Figure 6:
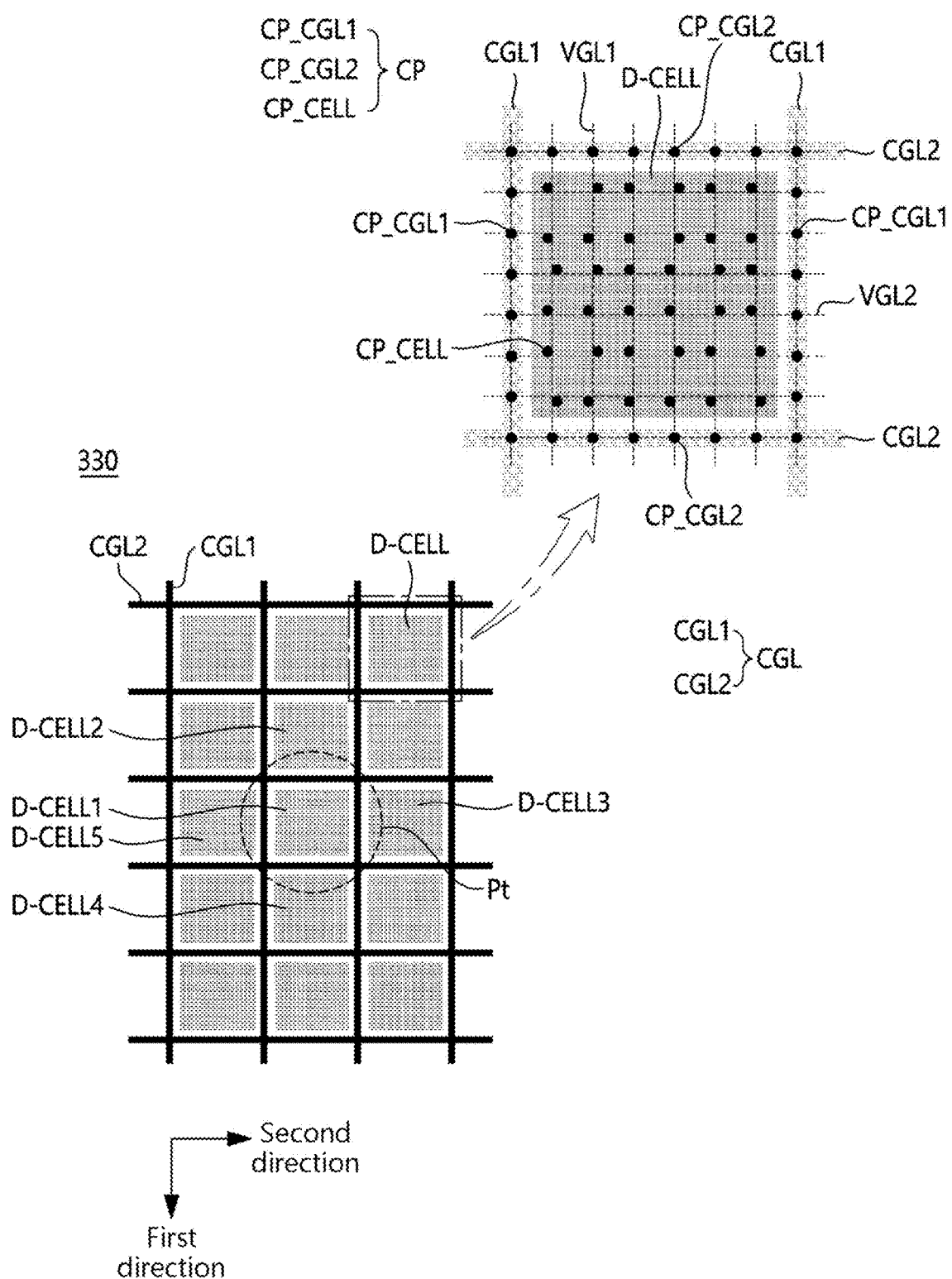
FIG. 6 is a view illustrating a configuration of an infrared reflective pattern in a display panel according to embodiments of the disclosure.

FIG. 6 is a view illustrating a configuration of an infrared reflective pattern in a display panel according to embodiments of the disclosure.

Referring to FIG. 6, the infrared reflective pattern 330 in the display panel 110 according to embodiments of the disclosure may include guide lines CGL and cell areas D-CELL located between the guide lines CGL.

For example, the infrared reflective pattern 330 may include a plurality of cell areas D-CELL arranged in rows and columns, a plurality of first guide lines CGL1 disposed between adjacent cell areas D-CELL in a second direction, and a plurality of second guide lines CGL2 disposed between adjacent cell areas D-CELL in a first direction.

Each of the plurality of first guide lines CGL1 may extend in the first direction, and each of the plurality of second guide lines CGL2 may extend in the second direction.

The plurality of infrared reflective patterns 330 may include a plurality of first guide patterns CP_CGL1 for indicating the plurality of first guide lines CGL1, a plurality of second guide patterns CP_CGL2 for indicating the plurality of second guide lines CGL2, and a plurality of cell patterns CP_CELL disposed in rows and columns in the plurality of cell areas D-CELL.

The array shape of the plurality of cell patterns CP_CELL may be different for each of the plurality of cell areas D-CELL.

The plurality of cell patterns CP_CELL included in each of the plurality of cell areas D-CELL may be arranged in a matrix form of m rows and n columns.

In each of the plurality of cell areas D-CELL, the plurality of cell patterns CP_CELL may be arranged along virtual grid lines VGL1, VGL2 of m rows and n columns.

Each of the plurality of cell areas D-CELL may correspond to one coordinate data. The entire arrangement position of the plurality of cell patterns CP_CELL included in each of the plurality of cell areas D-CELL may represent one coordinate data. Accordingly, the positions of the plurality of cell patterns CP_CELL arranged in m rows and n columns for each of the plurality of cell areas D-CELL may be slightly different.

The plurality of cell patterns CP_CELL included in each of the plurality of cell areas D-CELL may have a unique array shape (also referred to as a unique array position pattern) corresponding to unique coordinates.

The unique array position pattern of the plurality of cell patterns CP_CELL included in each of the plurality of cell areas D-CELL may be an encryption pattern representing one unique coordinate.

For example, each of the plurality of cell areas D-CELL may include a unique pattern arranged in 36 cell patterns CP_CELL with six rows and six columns to represent (code) unique coordinates.

The first cell area D-CELL1 may include 36 cell patterns CP_CELL to represent the first coordinates. The second cell area D-CELL2 may include 36 cell patterns CP_CELL to represent the second coordinates. The third cell area D-CELL3 may include 36 cell patterns CP_CELL to represent the third coordinates. The fourth cell area D-CELL4 may include 36 cell patterns CP_CELL to represent the fourth coordinates. The fifth cell area D-CELL5 may include 36 cell patterns CP_CELL to represent fifth coordinates.

The array position of the 36 cell patterns CP_CELL included in the first cell area D-CELL1 may be an encryption pattern indicating the first coordinates, the array position of the 36 cell patterns CP_CELL included in the second cell area D-CELL2 may be an encryption pattern indicating the second coordinates, the array position of the 36 cell patterns CP_CELL included in the third cell area D-CELL3 may be an encryption pattern indicating the third coordinates, the array position of the 36 cell patterns CP_CELL included in the fourth cell area D-CELL4 may be an encryption pattern indicating the fourth coordinates, and the array position of the 36 cell patterns CP_CELL included in the fifth cell area D-CELL5 may be an encryption pattern indicating the fifth coordinates.

In other words, the first coordinates corresponding to the first cell area D-CELL1, the second coordinates corresponding to the second cell area D-CELL2, the third coordinates corresponding to the third cell area D-CELL3, the fourth coordinates corresponding to the fourth cell area D-CELL4, and the fifth coordinates corresponding to the fifth cell area D-CELL5 are all different. Accordingly, the array position of the 36 cell patterns CP_CELL included in the first cell area D-CELL1, the array position of the 36 cell patterns CP_CELL included in the second cell area D-CELL2, the array position of the 36 cell patterns CP_CELL included in the third cell area D-CELL3, the array position of the 36 cell patterns CP_CELL included in the fourth cell area D-CELL4, and the array position of the 36 cell patterns CP_CELL included in the fifth cell area D-CELL5 may all be different from each other.

Each of the plurality of cell areas D-CELL may correspond to a partial area of the display area DA. Each cell area D-CELL may overlap a group of two or more subpixels among a plurality of subpixels included in the display area DA. For example, the first cell area D-CELL1 may overlap a first group including two or more first subpixels, and the second cell area D-CELL2 may overlap a second group including two or more second subpixels. Two or more first subpixels included in the first group and two or more second subpixels included in the second group may be different from each other.

The infrared stylus may recognize the plurality of infrared absorption patterns 330 based on the reflected light, may recognize the plurality of first guide lines CGL1 and the plurality of second guide lines CGL2 based on the recognition result, and may recognize the plurality of cell areas D-CELL partitioned by the plurality of first guide lines CGL1 and the plurality of second guide lines CGL2.

The infrared stylus may recognize the array position of the plurality of cell patterns CP_CELL included in at least one of the plurality of cell areas D-CELL, and may determine the position (touch position) of the infrared stylus based on the recognition result.

For example, when the infrared stylus touches the position Pt centered on the first cell area D-CELL1, the infrared stylus may recognize the array position of the plurality of cell patterns CP_CELL included in each of the first to fifth cell areas D-CELL1 to D-CELL5 based on the detecting result of the reflected light with a different shade or wavelength, and may calculate a more precise touch position based on the first to fifth coordinates corresponding to the first to fifth cell areas D-CELL1 to D-CELL5 and the difference in signal intensities between the reflected lights.

Figure 7:
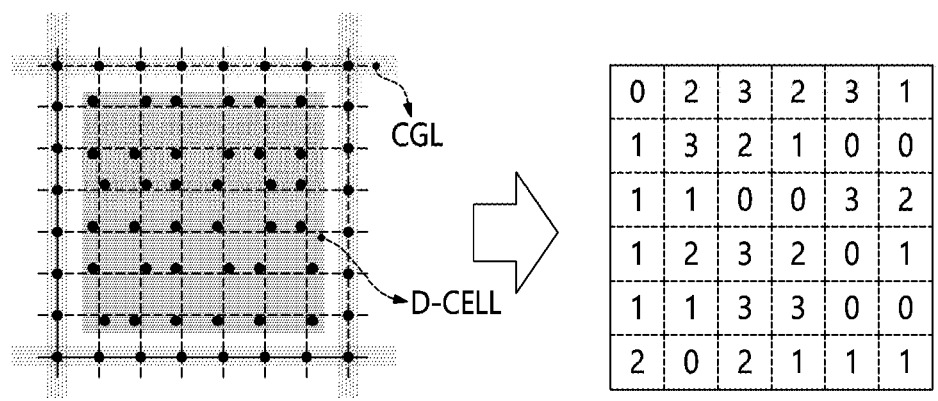
FIG. 7 is a diagram illustrating an infrared reflective pattern formed in a touch display device according to embodiments of the disclosure.

FIG. 7 is a diagram illustrating an infrared reflective pattern formed in a touch display device according to embodiments of the disclosure.

Referring to FIG. 7, the infrared reflective pattern 330 of the touch display device 100 according to embodiments of the disclosure may be formed as a dot pattern that reflects infrared lights on the surface of the display panel 110.

The infrared reflective pattern 330 may include cell areas D-CELL where the encrypted dot pattern is located and guide lines CGL for distinguishing the cell areas D-CELL. The dots located in the cell areas D-CELL may be corresponded to dot values designated based on the position at which they were formed. For example, each dot may correspond to a dot value of 0 to 3 depending on which direction the dot is located (up, down, left and right) from the intersection of the virtual grid lines in the cell area D-CELL.

Additionally, each dot value may be converted into a first bit value of X coordinates and a second bit value of Y coordinates. By combining the corresponding information, the coordinates on the surface of the display panel 110 including the infrared reflective pattern 330 may be determined.

Here, it illustrates a case that 6×6 dots are arranged in a unit grid including horizontal and vertical areas of a certain length and they have different patterns no matter which direction the dot distributions are detected. The unit grid formed by these 36 dots may represent different coordinates on the surface of the display panel 110.

The infrared stylus 200 may determine the dot value corresponding to the infrared reflective pattern 330 by detecting infrared lights reflected from the display panel 110 through the infrared sensor 210.

Figure 8:
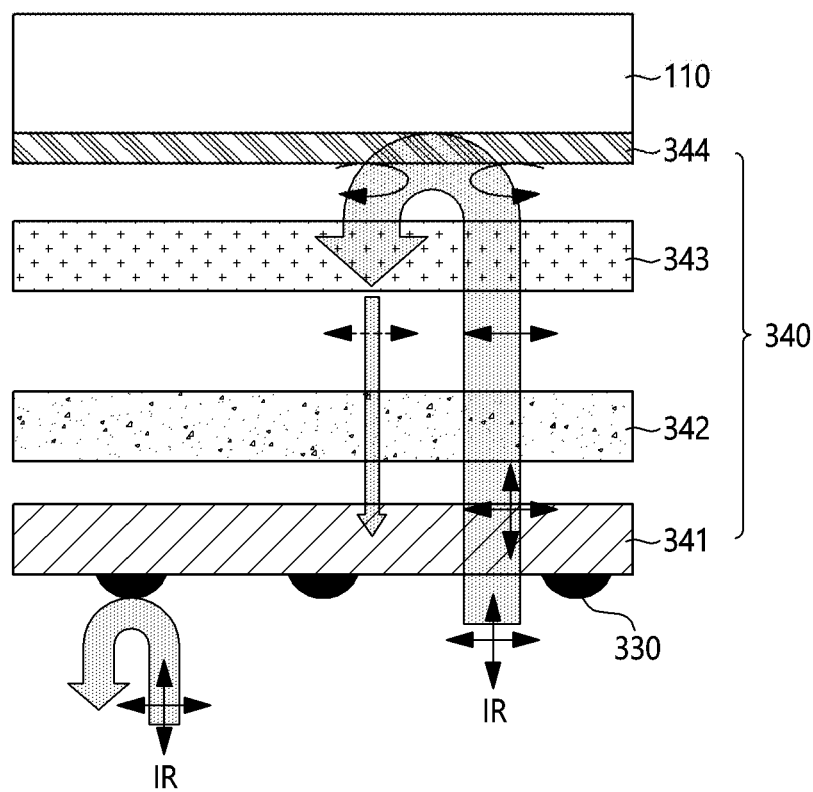
FIG. 8 is a diagram illustrating a structure of an infrared reflective pattern and an infrared blocking film in a touch display device according to embodiments of the disclosure.
Figure 9:
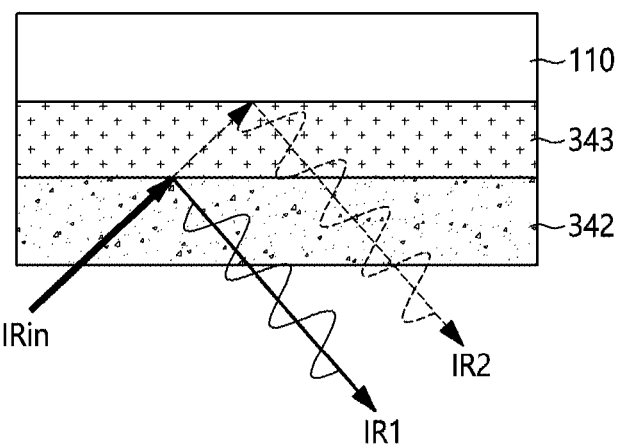
FIG. 9 is a diagram illustrating a concept of destructive interference for infrared lights by an infrared blocking film in a touch display device according to embodiments of the disclosure.
Figure 9:
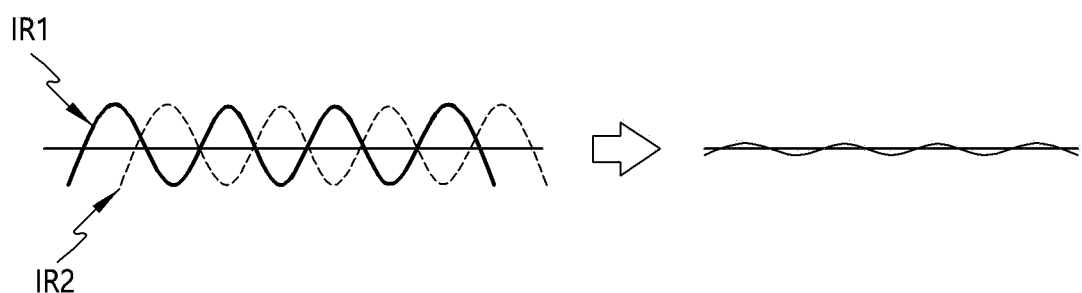

FIG. 8 is a diagram illustrating a structure of an infrared reflective pattern and an infrared blocking film in a touch display device according to embodiments of the disclosure, and FIG. 9 is a diagram illustrating a concept of destructive interference for infrared lights by an infrared blocking film in a touch display device according to embodiments of the disclosure.

Referring to FIGS. 8 and 9, the touch display device 100 according to embodiments of the disclosure may include an infrared blocking film 340 disposed on the emission surface of the display panel 110 and an infrared reflective pattern 330 disposed on an outer surface of the infrared blocking film 340.

The infrared blocking film 340 may include a base film 341, a first polarizing layer 342, a second polarizing layer 343, and an adhesive layer 344.

The infrared reflection pattern 330 may be formed on a surface of the base film 341 constituting the infrared blocking film 340.

The base film 341 includes a tri-acetyl-cellulose (TAC) film or a polyester (PET) film.

The first polarizing layer 342 is a part that converts infrared light incident through the opening area of the infrared reflective pattern 330 into linear polarized light in a specific direction. The first polarizing layer 342 includes polyvinyl butyral resin (PVB), polyvinyl alcohol resin (PVA), or ethylene-vinyl acetate copolymer resin (EVA).

The second polarizing layer 343 includes a quarter wave plate that delays the infrared lights converted into linear polarized light through the first polarizing layer 342 by ¼ wavelength.

Therefore, infrared lights IRin incident in the display panel 110 are delayed by ¼ wavelength through the second polarizing layer 343, reflected in the display panel 110 and delayed by ½ wavelength again through the second polarizing layer 343.

As a result, a first infrared light IR1 which passes through the first polarizing layer 342 and is reflected by the second polarizing layer 343 has a phase opposite to a second infrared light IR2 which is reflected in the display panel 110 and passes through the second polarizing layer 343, thereby causing a destructive interference.

Therefore, most of the infrared lights incident through the opening area of the infrared reflective pattern 330 are destructed out and extinguished in the infrared blocking film 340. As a result, almost no infrared lights are transmitted to the outside through the opening area of the infrared reflective pattern 330.

The adhesive layer 344 serves to bond the infrared blocking film 340 to the display panel 110.

The adhesive layer 344 may include a base resin, a crosslinking agent, a binder, and additives. The base resin is a polymer material made of acrylic monomer, for example, it may be an alkyl acrylate having 4 to 17 carbon atoms. Additionally, the base resin may contain functional group monomers that adjust polarity and react with crosslinking agents.

The crosslinking agent may form a three-dimensional network structure by connecting linear copolymer chains, and may advance heat resistance by improving the cohesion of the adhesive layer 344.

The binder may form a strong bonding force to a part (e.g., substrate) bonding to the adhesive layer 344. In particular, the binder may improve the bonding strength with the organic adhesive layer 344 when the bonding part is an inorganic material.

The additives may reduce a charging of the adhesive layer 344, and include dyes or pigments to control a transmittance.

The adhesive layer 344 may have a transmittance for infrared lights lower than a transmittance for visible lights in order to reduce infrared lights reflected from the display panel 110 to be transmitted to the outside of the display panel 110.

Figure 10:
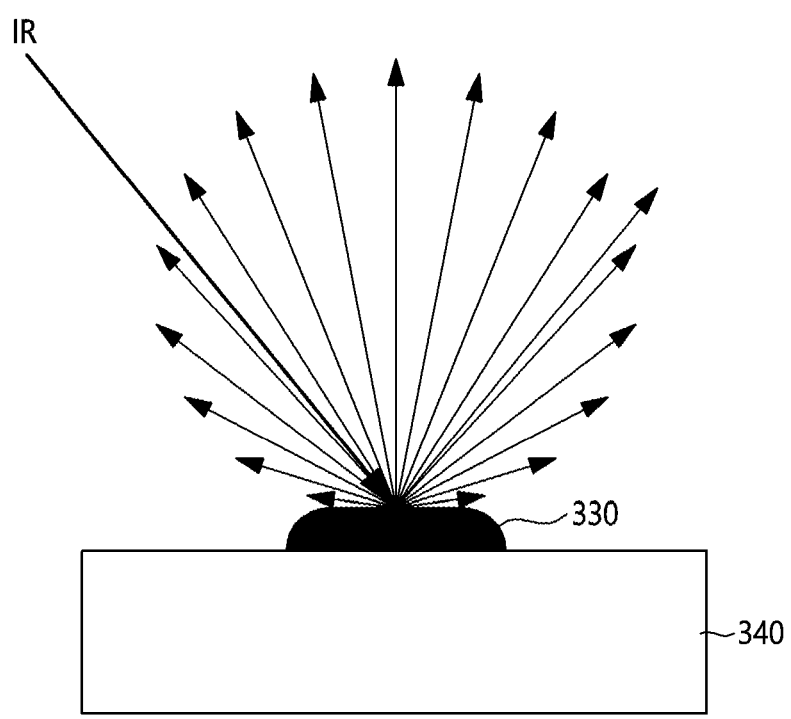
FIG. 10 is a diagram illustrating a cross-sectional structure of an infrared reflective pattern according to embodiments of the disclosure.

FIG. 10 is a diagram illustrating a cross-sectional structure of an infrared reflective pattern according to embodiments of the disclosure.

Referring to FIG. 10, the infrared reflective pattern 330 according to embodiments of the disclosure may be formed on the surface of the infrared blocking film 340, and include a pattern area and an opening area. The pattern area is arranged in an encrypted form with a dot pattern that reflects the infrared lights IR, and the opening area may transmit the infrared lights coming from the outside.

The dot patterns forming the pattern area may have an oval or circular protruding structure to make a scattered reflection of infrared lights IR.

In this way, when the dot patterns are formed with a protruding structure, infrared lights incident on the pattern area may make a scattered reflection in all directions of 360 degrees due to the protruding structure of the dot patterns.

As a result, even though the inclination angle of the infrared stylus 200 with respect to the display panel 110 is large, infrared lights totally reflected in the infrared reflective pattern 330 may be effectively detected.

Figure 11A:
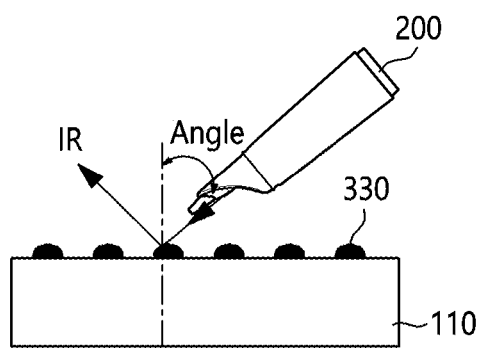
FIGS. 11A and 11B are diagrams experimentally illustrating a detection intensity of infrared lights reflected based on the inclination angle of the infrared stylus with respect to the infrared reflective pattern according to embodiments of the disclosure.
Figure 11B:
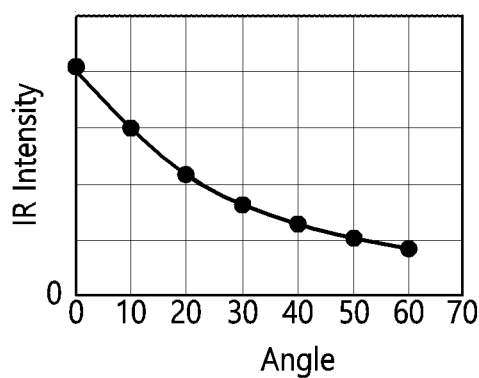

FIGS. 11A and 11B are diagrams experimentally illustrating a detection intensity of infrared lights reflected based on the inclination angle of the infrared stylus with respect to the infrared reflective pattern according to embodiments of the disclosure.

Referring to FIGS. 11A and 11B, the infrared sensor 210 of the infrared stylus 200 may not detect a portion of infrared lights reflected from an infrared reflective pattern 330 depending on the inclination angle Angle formed between a normal line of the display panel 110 and an infrared stylus 200 in the touch display device 100 according to embodiments of the disclosure.

However, the touch display device 100 of the disclosure may make a scattered reflection for the infrared lights IR by forming the dot patterns constituting the pattern area in the infrared reflective pattern 330 into an oval or circular protruding structure.

In this way, when the dot patterns are formed with a protruding structure, infrared lights incident on the pattern area may make a scattered reflection in all directions 360 degrees due to the protruding structure of the dot pattern.

As a result, even though the inclination angle Angle of the infrared stylus 200 with respect to the display panel 110 is large, the infrared stylus 200 may maintain an effect of detecting infrared lights reflected by total reflection in the infrared reflective pattern 330.

Meanwhile, the infrared reflective pattern 330 may be formed on outer surface of the infrared blocking film 340, but may also be formed on inner surface of the infrared blocking film 340 in the touch display device 100 of the present disclosure.

Figure 12:
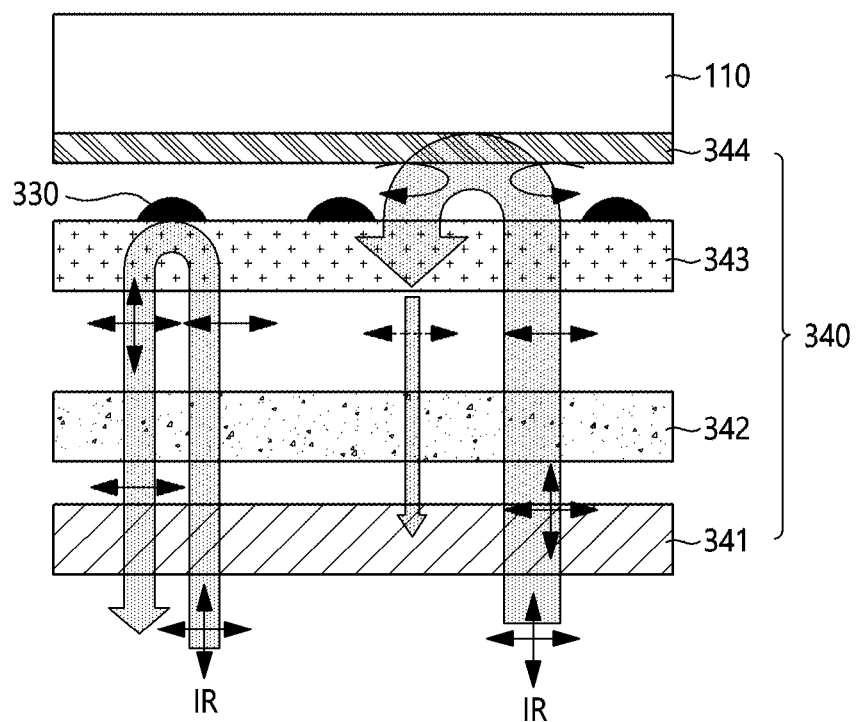
FIG. 12 is a cross-sectional view illustrating an infrared reflective pattern formed on a surface of a second polarizing layer in a touch display device according to embodiments of the disclosure.

FIG. 12 is a cross-sectional view illustrating an infrared reflective pattern formed on a surface of a second polarizing layer in a touch display device according to embodiments of the disclosure.

Referring to FIG. 12, the touch display device 100 according to embodiments of the disclosure may include an infrared blocking film 340 disposed on the emission surface of the display panel 110 and an infrared reflective pattern 330 disposed on an inner surface of the infrared blocking film 340.

The infrared blocking film 340 may include a base film 341, a first polarizing layer 342, a second polarizing layer 343, and an adhesive layer 344.

The infrared reflection pattern 330 may be formed on a surface of the second polarizing layer 343 constituting the infrared blocking film 340.

The base film 341 includes a tri-acetyl-cellulose (TAC) film or a polyester (PET) film.

The first polarizing layer 342 is a part that converts infrared lights into linear polarized light in a specific direction. The first polarizing layer 342 includes polyvinyl butyral resin (PVB), polyvinyl alcohol resin (PVA), or ethylene-vinyl acetate copolymer resin (EVA).

The second polarizing layer 343 includes a quarter wave plate that delays the infrared lights converted into linear polarized light through the first polarizing layer 342 by ¼ wavelength.

The infrared reflective pattern 330 may be formed on a surface of the second polarizing layer 343, and may include a pattern area made of an encrypted dot pattern and an opening area in which no dot pattern is formed.

The infrared lights incident through the opening area of the infrared reflective pattern 330 are delayed by ¼ wavelength through the second polarizing layer 343, reflected in the display panel 110 and delayed by ½ wavelength again through the second polarizing layer 343.

As a result, a first infrared light which passes through the first polarizing layer 342 and is reflected by the second polarizing layer 343 has a phase opposite to a second infrared light which is reflected in the display panel 110 and passes through the second polarizing layer 343, thereby causing a destructive interference.

Therefore, most of the infrared lights incident through the opening area of the infrared reflective pattern 330 are destructed out and extinguished in the infrared blocking film 340. As a result, almost no infrared lights are transmitted to the outside through the opening area of the infrared reflective pattern 330.

On the other hand, infrared lights incident on the pattern area of the infrared reflective pattern 330 may be totally reflected by the dot patterns and transmitted to the outside of the display panel 110.

The adhesive layer 344 serves to bond the infrared blocking film 340 to the display panel 110. The adhesive layer 344 may include a base resin, a crosslinking agent, a binder, and additives.

Figure 13:
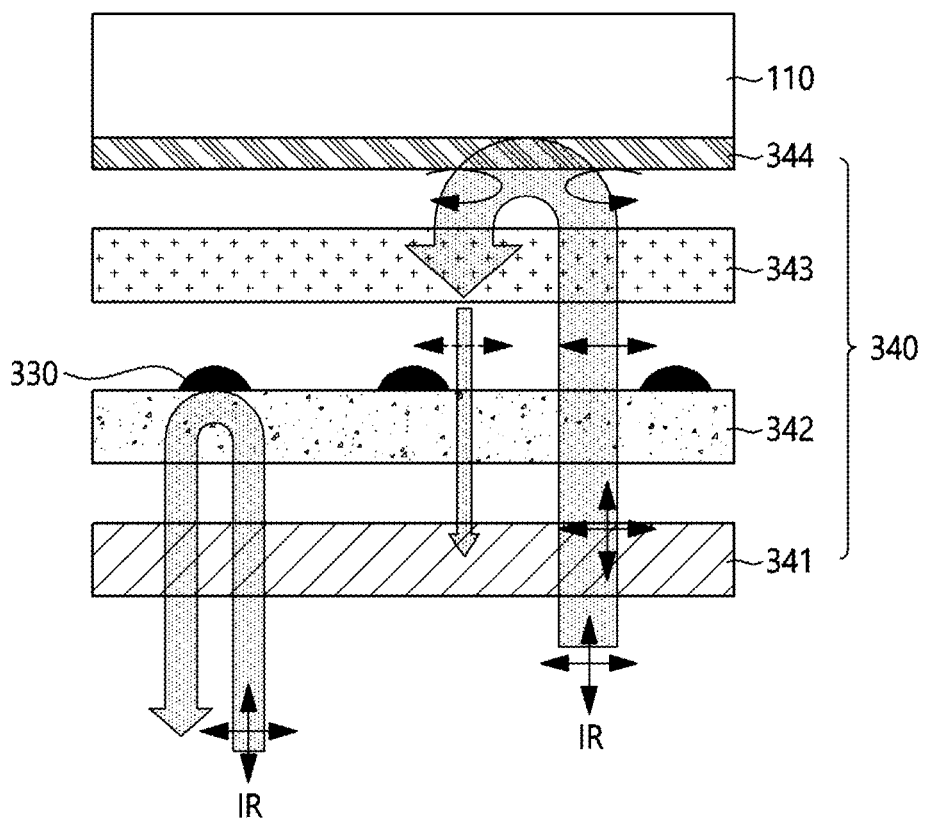
FIG. 13 illustrates a case which an infrared reflective pattern is formed on a surface of a first polarizing layer in a touch display device according to embodiments of the disclosure.

FIG. 13 illustrates a case which an infrared reflective pattern is formed on a surface of a first polarizing layer in a touch display device according to embodiments of the disclosure.

Referring to FIG. 13, the touch display device 100 according to embodiments of the disclosure may include an infrared blocking film 340 disposed on the emission surface of the display panel 110 and an infrared reflective pattern 330 disposed on an inner surface of the infrared blocking film 340.

The infrared blocking film 340 may include a base film 341, a first polarizing layer 342, a second polarizing layer 343, and an adhesive layer 344.

The infrared reflection pattern 330 may be formed on a surface of the first polarizing layer 342 constituting the infrared blocking film 340.

The base film 341 includes a tri-acetyl-cellulose (TAC) film or a polyester (PET) film.

The first polarizing layer 342 is a part that converts infrared lights into linear polarized light in a specific direction. The first polarizing layer 342 includes polyvinyl butyral resin (PVB), polyvinyl alcohol resin (PVA), or ethylene-vinyl acetate copolymer resin (EVA).

The infrared reflective pattern 330 may be formed on a surface of the first polarizing layer 342, and may include a pattern area made of an encrypted dot pattern and an opening area in which no dot pattern is formed.

The second polarizing layer 343 includes a quarter wave plate that delays the infrared lights converted into linear polarized light through the first polarizing layer 342 by ¼ wavelength.

The infrared lights incident through the opening area of the infrared reflective pattern 330 are delayed by ¼ wavelength through the second polarizing layer 343, reflected in the display panel 110 and delayed by ½ wavelength again through the second polarizing layer 343.

As a result, a first infrared light which passes through the first polarizing layer 342 and is reflected by the second polarizing layer 343 has a phase opposite to a second infrared light which is reflected in the display panel 110 and passes through the second polarizing layer 343, thereby causing a destructive interference.

Therefore, most of the infrared lights incident through the opening area of the infrared reflective pattern 330 are destructed out and extinguished in the infrared blocking film 340. As a result, almost no infrared lights are transmitted to the outside through the opening area of the infrared reflective pattern 330.

On the other hand, infrared lights incident on the pattern area of the infrared reflective pattern 330 may be totally reflected by the dot patterns and transmitted to the outside of the display panel 110.

The adhesive layer 344 serves to bond the infrared blocking film 340 to the display panel 110. The adhesive layer 344 may include a base resin, a crosslinking agent, a binder, and additives.

Meanwhile, the touch display device 100 of the disclosure may include a low-reflective metal with a low reflectance for infrared lights as metal electrodes in the display panel 110. For example, metal electrodes reflecting infrared lights may be an anode electrode, a cathode electrode, a transistor electrode, and metal line. The touch display device 100 may use the metal electrodes made of a low-reflective metal with an infrared reflectance of 10% or less.

In this way, when a low-reflective metal is used in the display panel 110, the polarizing layers 342, 343 may be omitted and the infrared blocking film 340 may be composed of the base film 341 and the adhesive layer 344.

Figure 14:
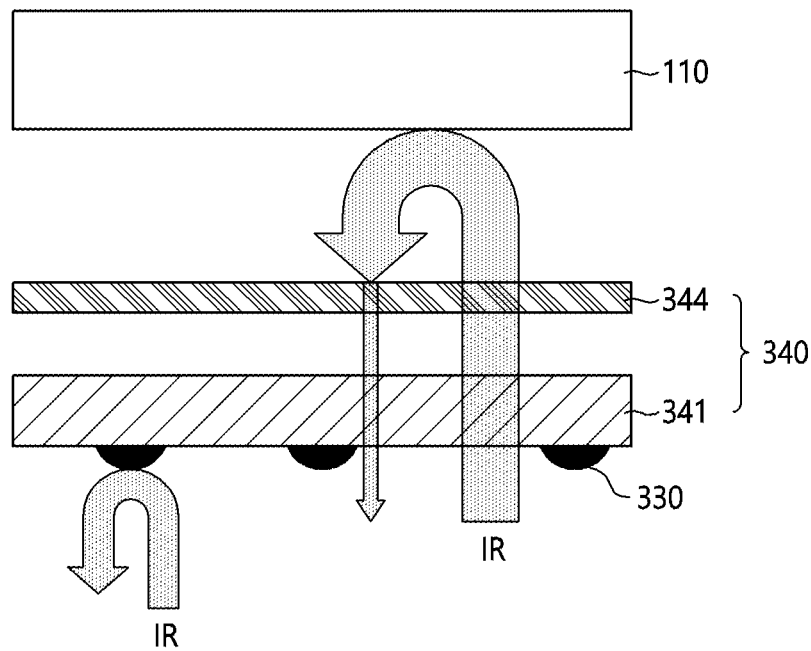
FIG. 14 is a cross-sectional view illustrating an infrared blocking film and an infrared reflective pattern coupled to a display panel including a low-reflective electrode in a touch display device according to embodiments of the disclosure.

FIG. 14 is a cross-sectional view illustrating an infrared blocking film and an infrared reflective pattern coupled to a display panel including a low-reflective electrode in a touch display device according to embodiments of the disclosure.

Referring to FIG. 14, the metal electrodes used inside the display panel 110 of the touch display device 100 according to embodiments of the disclosure may be a low-reflective metal with a low reflectance for infrared lights. For example, the metal electrodes reflecting infrared lights may include an anode electrode, a cathode electrode, a transistor electrode, and a metal line, and such metal electrodes may be low-reflective metal with an infrared reflectance of 10% or less.

The infrared blocking film 340 may be disposed on the emission surface of the display panel 110 and an infrared reflective pattern 330 may be disposed on an outer surface of the infrared blocking film 340.

The infrared blocking film 340 may include a base film 341 and an adhesive layer 344.

The base film 341 includes a tri-acetyl-cellulose (TAC) film or a polyester (PET) film.

The adhesive layer 344 serves to bond the infrared blocking film 340 to the display panel 110. The adhesive layer 344 may include a base resin, a crosslinking agent, a binder, and additives.

The infrared reflective pattern 330 may be formed on a surface of the adhesive layer 344, and may include a pattern area made of an encrypted dot pattern and an opening area in which no dot pattern is formed.

Infrared lights incident through the opening area of the infrared reflective pattern 330 may be reflected by the low-reflective metal disposed in the display panel 110, and about 10% or less of the infrared lights may be emitted to the outside.

On the other hand, infrared lights incident on the pattern area of the infrared reflective pattern 330 may be totally reflected by the dot pattern and transmitted to the outside of the display panel 110.

Therefore, since a reflectance of infrared lights reflected through the opening area of the infrared reflective pattern 330 is different from a reflectance of infrared lights totally reflected through the pattern area of the infrared reflective pattern 330, the infrared stylus 200 may generate location data by detecting the reflected infrared lights.

At this time, the detection performance of reflected infrared lights may be improved by forming the adhesive layer 344 constituting the infrared blocking film 340 as a material with a reflectance for infrared lights lower than a reflectance for visible lights.

Figure 15:
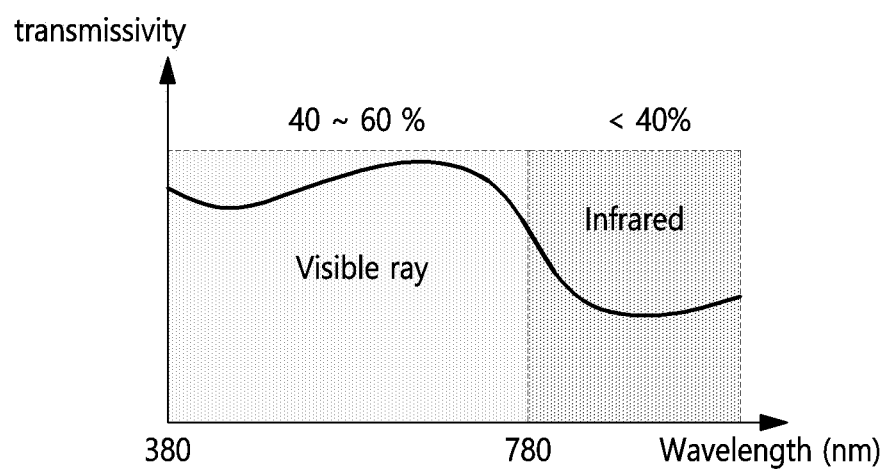
FIG. 15 is a diagram illustrating the transmittance of an adhesive layer constituting an infrared blocking film in a touch display device according to embodiments of the disclosure.

FIG. 15 is a diagram illustrating the transmittance of an adhesive layer constituting an infrared blocking film in a touch display device according to embodiments of the disclosure.

Referring to FIG. 15, the touch display device 100 according to embodiments of the disclosure may include an infrared blocking film 340 and an infrared reflective pattern 330 disposed on a surface of the display panel 110.

The infrared blocking film 340 may include a base film 341 and an adhesive layer 344.

At this time, the adhesive layer 344 of the infrared blocking film 340 may have a transmittance for infrared lights lower than a transmittance for visible lights. As a result, noise of infrared lights reflected from the internal electrode of the display panel 110 may be reduced and the precision for detecting touch coordinates may be improved.

For example, the adhesive layer 344 may maintain the transmittance for visible lights reflected from the inside of the display panel 110 at 40 to 60%, but may maintain the transmittance for infrared lights at less than 40%, which is lower than the transmittance for visible lights.

To this end, the components of the dye or pigment injected into the additives constituting the adhesive layer 344 may be controlled.

In this way, when the transmittance for infrared lights is lower than the transmittance for visible lights in the adhesive layer 344, the touch coordinates of the infrared stylus 200 by reflected infrared lights may be effectively detected since the infrared lights totally reflected at the infrared reflective pattern 330 are distinguished from the infrared lights reflected in the display panel 110.

Meanwhile, the touch display device 100 of the disclosure may further include a diffusion bead layer between the infrared reflective pattern 330 and the infrared blocking film 340.

Figure 16:
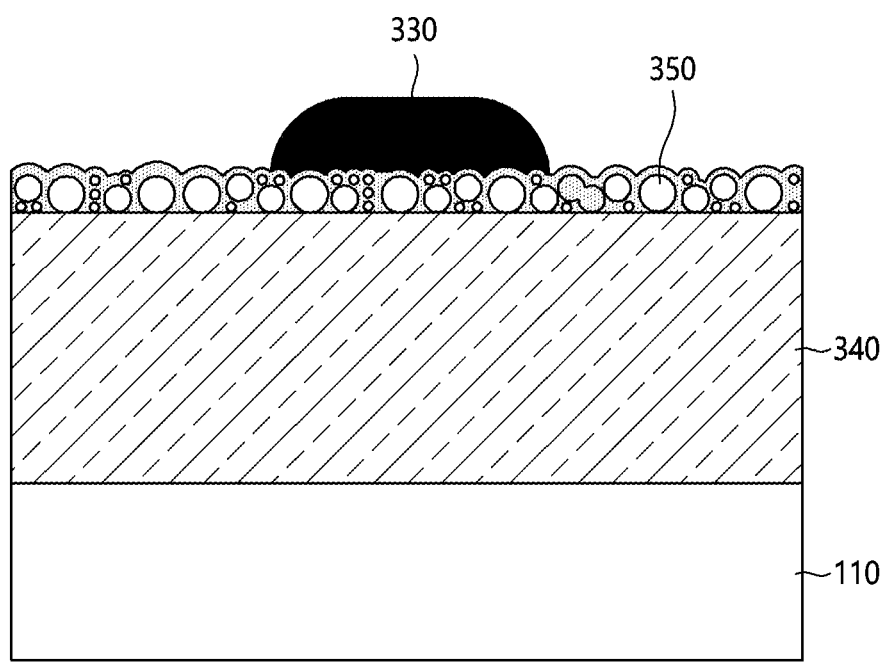
FIG. 16 is a diagram illustrating another structure of a touch display device according to embodiments of the disclosure.

FIG. 16 is a diagram illustrating another structure of a touch display device according to embodiments of the disclosure.

Referring to FIG. 16, the touch display device 100 according to embodiments of the disclosure may include an infrared blocking film 340 formed on the emission surface of the display panel 110, a diffusion bead layer 350, and an infrared reflective pattern 330.

The infrared blocking film 340 may include a base film 341, a first polarizing layer 342, a second polarizing layer 343, and an adhesive layer 344. Alternatively, the infrared blocking film 340 may include a base film 341 and an adhesive layer 344.

The diffusion bead layer 350 may be formed on the surface of the infrared blocking film 460. The diffusion bead layer 350 includes particles to scatter infrared lights going into the display panel 110 or reflected from the inside of the display panel 110. In some embodiments, the diffusion bead layer 350 may be made of particles to scatter infrared lights going into the display panel 110 or reflected from the inside of the display panel 110.

The infrared reflective pattern 330 may be formed over the diffusion bead layer 350.

Infrared rays are totally reflected by the infrared reflective pattern 330, but are also scattered by the diffusion bead layer 350. Therefore, the reflected infrared lights may be effectively detected regardless of the position or inclination angle of the infrared stylus 200.

The touch display device 100 of the disclosure may include a transparent cover glass on the emission surface. When the cover glass is located on the emission surface of the touch display device 100, the infrared reflective pattern 330 may be formed on the inner or outer surface of the cover glass.

Figure 17:
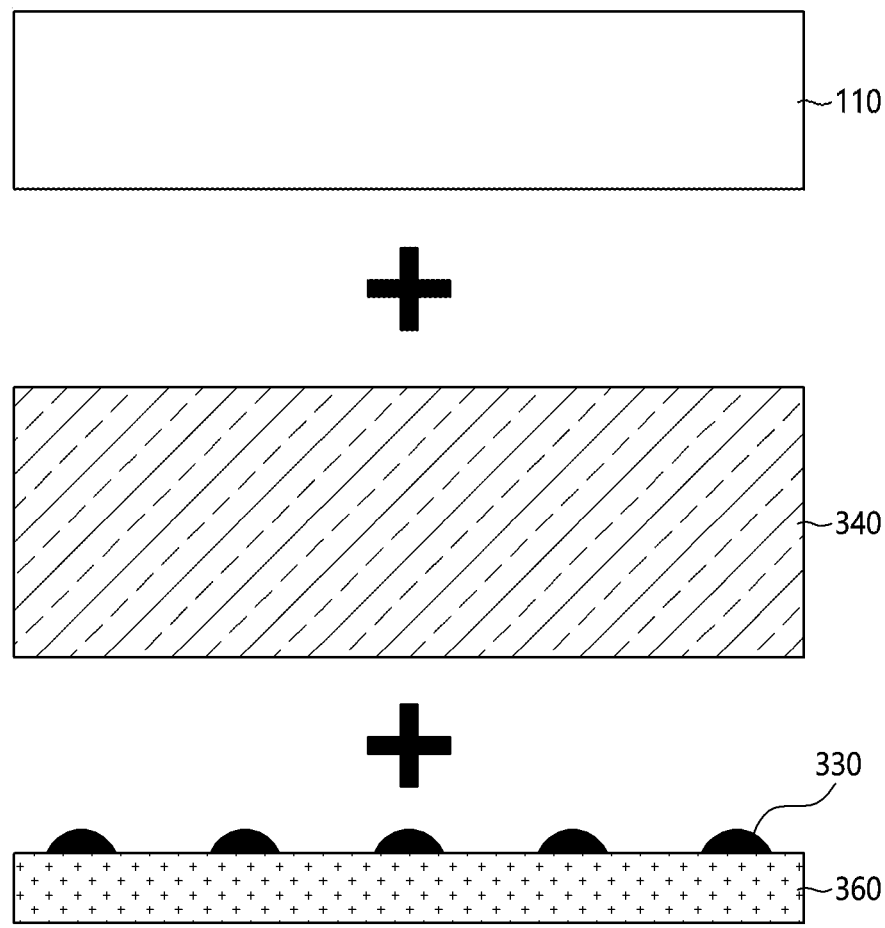
FIG. 17 is a diagram illustrating a case that an infrared reflective pattern is disposed on the inner surface of the cover glass in a touch display device according to embodiments of the disclosure.
Figure 18:
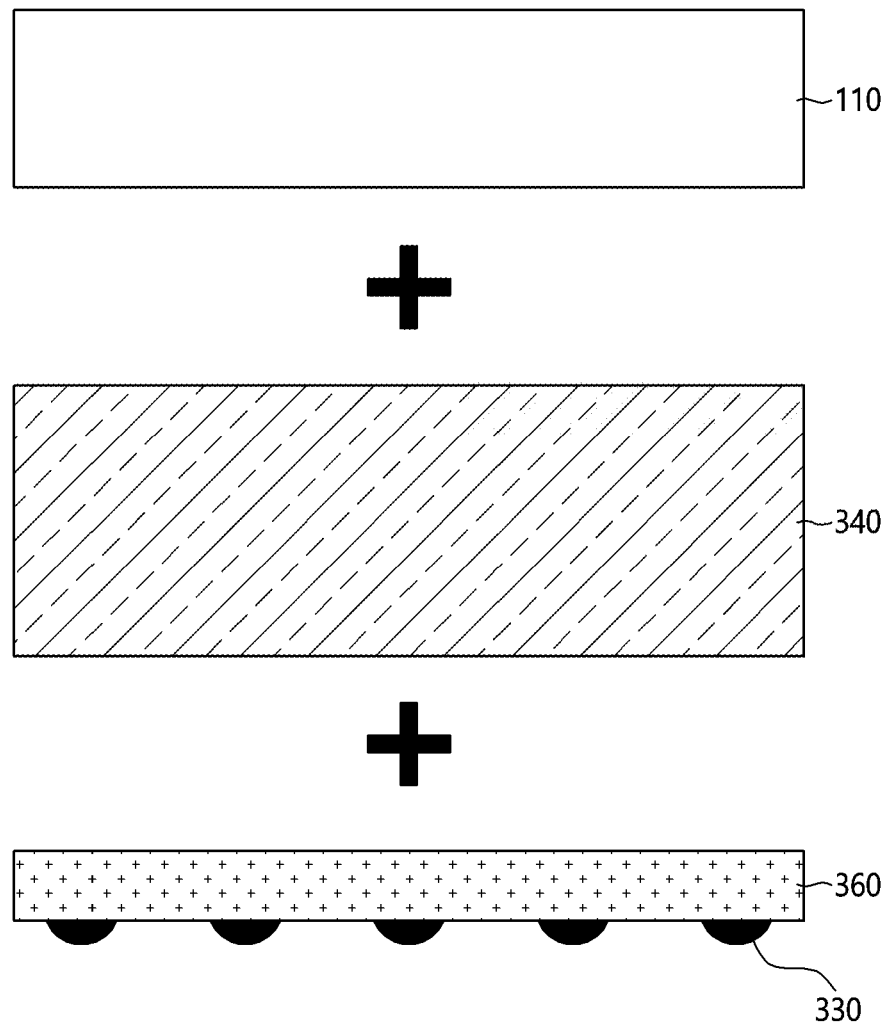
FIG. 18 is a diagram illustrating a case that an infrared reflective pattern is disposed on the outer surface of the cover glass in a touch display device according to embodiments of the disclosure.

FIG. 17 is a diagram illustrating a case that an infrared reflective pattern is disposed on the inner surface of the cover glass in a touch display device according to embodiments of the disclosure, and FIG. 18 is a diagram illustrating a case that an infrared reflective pattern is disposed on the outer surface of the cover glass in a touch display device according to embodiments of the disclosure.

Referring to FIGS. 17 and 18, the touch display device 100 according to embodiments of the disclosure may include a display panel 110, an infrared blocking film 340, a cover glass 360, and an infrared reflective pattern 330.

The infrared blocking film 340 may be coupled to the emission surface of the display panel 110 through an adhesive layer.

The infrared blocking film 340 may include a base film 341, a first polarizing layer 342, a second polarizing layer 343, and an adhesive layer 344. Otherwise, the infrared blocking film 340 may include a base film 341 and an adhesive layer 344.

The cover glass 360 includes a transparent material and may be coupled to the infrared blocking film 340.

The infrared reflective pattern 330 may be disposed on the inner surface of the cover glass 360, or may be disposed on the outer surface of the cover glass 360.

The infrared reflective pattern 330 may be formed on the surface of the cover glass 360 by a photo process using a photo resist or a printing process using an ink material.

The infrared blocking film 340 may be bonded to the cover glass 360, for example, through an optical clear adhesive.

Embodiments of the disclosure described above are briefly described below.

A touch display device according to embodiments of the disclosure may comprise a display panel including a light emitting element and a transistor made of a plurality of metal electrodes, an infrared blocking film disposed on an emission surface of the display panel, and an infrared reflective pattern disposed on an inner or outer surface of the infrared blocking film.

The infrared reflective pattern includes a pattern area including encrypted dot patterns, and an opening area between the dot patterns.

The dot patterns include a circular or oval protruding structure.

The dot patterns include a multilayer thin film deposited with silicon oxide or titanium oxide.

The dot patterns have an infrared reflectance of 80% or more.

The infrared blocking film includes a base film, a first polarizing layer disposed on the base film to convert infrared lights into linear polarized lights, a second polarizing layer that delays infrared lights converted into linear polarized lights through the first polarizing layer by ¼ wavelength, and an adhesive layer that couples the second polarizing layer to the display panel.

The first polarizing layer is made of polyvinyl butyral resin (PVB), polyvinyl alcohol resin (PVA), or ethylene-vinyl acetate copolymer resin (EVA).

The infrared reflective pattern is disposed on a surface of the first polarizing layer.

The infrared reflective pattern is disposed on a surface of the second polarizing layer.

The infrared reflective pattern is disposed on a surface of the base film.

The plurality of metal electrodes have an infrared reflectance of 10% or less.

The infrared blocking film includes a base film, and an adhesive layer that couples the base film to the display panel.

The adhesive layer has a transmittance for infrared lights lower than a transmittance for visible lights.

The transmittance for visible lights is 40% to 60%.

The transmittance for infrared lights is less than 40%.

A diffusion bead layer made of particles that scatter infrared lights is disposed on an outer surface of the infrared blocking film, and the infrared reflective pattern is disposed on an outer surface of the diffusion bead layer.

A cover glass is coupled to an outer surface of the infrared blocking film, and the infrared reflective pattern is disposed on an inner surface of the cover glass.

A cover glass is coupled to an outer surface of the infrared blocking film, and the infrared reflective pattern is disposed on an outer surface of the cover glass.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch display device, comprising:
    a display panel having an emission surface, the display panel including:
        a light emitting element; and
        a transistor including a plurality of metal electrodes;
    an infrared blocking film disposed on the emission surface of the display panel, the infrared blocking film having an inner surface and an outer surface; and
    an infrared reflective pattern disposed on the outer surface of the infrared blocking film,
    wherein the infrared reflective pattern includes:
        a pattern area including encrypted dot patterns, the encrypted dot patterns having an infrared reflectance of 80% or more; and
        an opening area between the encrypted dot patterns.

2. The touch display device of claim 1, wherein the encrypted dot patterns include a circular or oval protruding structure.

3. The touch display device of claim 1, wherein the encrypted dot patterns include a multilayer thin film deposited with silicon oxide or titanium oxide.

4. A touch display device, comprising:
    a display panel having an emission surface, the display panel including:
        a light emitting element; and
        a transistor including a plurality of metal electrodes;
    an infrared blocking film disposed on the emission surface of the display panel, the infrared blocking film having an inner surface and an outer surface; and
    an infrared reflective pattern disposed on the inner surface of the infrared blocking film,
    wherein the infrared blocking film includes:
    a base film;
    a first polarizing layer disposed on the base film, the first polarizing layer configured to convert infrared lights into linear polarized lights;
    a second polarizing layer that delays infrared lights converted into linear polarized lights through the first polarizing layer by ¼ wavelength; and
    an adhesive layer that couples the second polarizing layer to the display panel.

5. The touch display device of claim 4, wherein the first polarizing layer includes polyvinyl butyral resin (PVB), polyvinyl alcohol resin (PVA), or ethylene-vinyl acetate copolymer resin (EVA).

6. The touch display device of claim 4, wherein the infrared reflective pattern is disposed on a surface of the first polarizing layer.

7. The touch display device of claim 4, wherein the infrared reflective pattern is disposed on a surface of the second polarizing layer.

8. The touch display device of claim 4, wherein the infrared reflective pattern is disposed on a surface of the base film.

9. The touch display device of claim 1, wherein the plurality of metal electrodes has an infrared reflectance of 10% or less.

10. The touch display device of claim 1, wherein the infrared blocking film includes:
    a base film; and
    an adhesive layer that couples the base film to the display panel.

11. The touch display device of claim 10, wherein the adhesive layer has a transmittance for infrared lights lower than a transmittance for visible lights.

12. The touch display device of claim 11, wherein the transmittance for visible lights is 40% to 60%.

13. The touch display device of claim 11, wherein the transmittance for infrared lights is less than 40%.

14. The touch display device of claim 1, wherein a diffusion bead layer including particles that scatter infrared lights is disposed on an outer surface of the infrared blocking film, and
 wherein the infrared reflective pattern is disposed on an outer surface of the diffusion bead layer.

15. A touch display device, comprising:
 a display panel having an emission surface the display panel including:
  a light emitting element; and
  a transistor including a plurality of metal electrodes;
 an infrared blocking film disposed on the emission surface of the display panel, the infrared blocking film having an inner surface and an outer surface; and
 an infrared reflective pattern disposed on either the inner surface or the outer surface of the infrared blocking film,
 wherein a cover glass is coupled to an outer surface of the infrared blocking film, and
 wherein the infrared reflective pattern is disposed on either an inner surface or an outer surface of the cover glass.

* * * * *

UNITED STATES PATENT AND TRADEMARK OFFICE
CERTIFICATE OF CORRECTION

| | | |
|---|---|---|
| PATENT NO. | : 12,443,302 B2 | Page 1 of 1 |
| APPLICATION NO. | : 18/781600 | |
| DATED | : October 14, 2025 | |
| INVENTOR(S) | : JaeHo Lee et al. | |

It is certified that error appears in the above-identified patent and that said Letters Patent is hereby corrected as shown below:

On the Title Page

<u>Insert:</u>
--(30) Foreign Application Priority Data
Aug. 02, 2023 (KR).........10-2023-0101170--

In the Claims

<u>Column 23, Claim 15, Line 12:</u>
"emission surface the display" should read: --emission surface, the display--

Signed and Sealed this
Twenty-seventh Day of January, 2026

John A. Squires
*Director of the United States Patent and Trademark Office*